Sept. 20, 1949.  P. R. GIBSON  2,482,413
COMBINED TRACTOR POWERED DUMP WAGON AND ELEVATOR
Filed April 20, 1948  3 Sheets-Sheet 1

INVENTOR.
PAUL R. GIBSON
BY
McMorrow, Berman & Davidson
ATTORNEYS

Sept. 20, 1949. P. R. GIBSON 2,482,413
COMBINED TRACTOR POWERED DUMP WAGON AND ELEVATOR
Filed April 20, 1948 3 Sheets-Sheet 2

INVENTOR.
PAUL R. GIBSON
BY
McMorrow, Berman & Davidson
ATTORNEYS

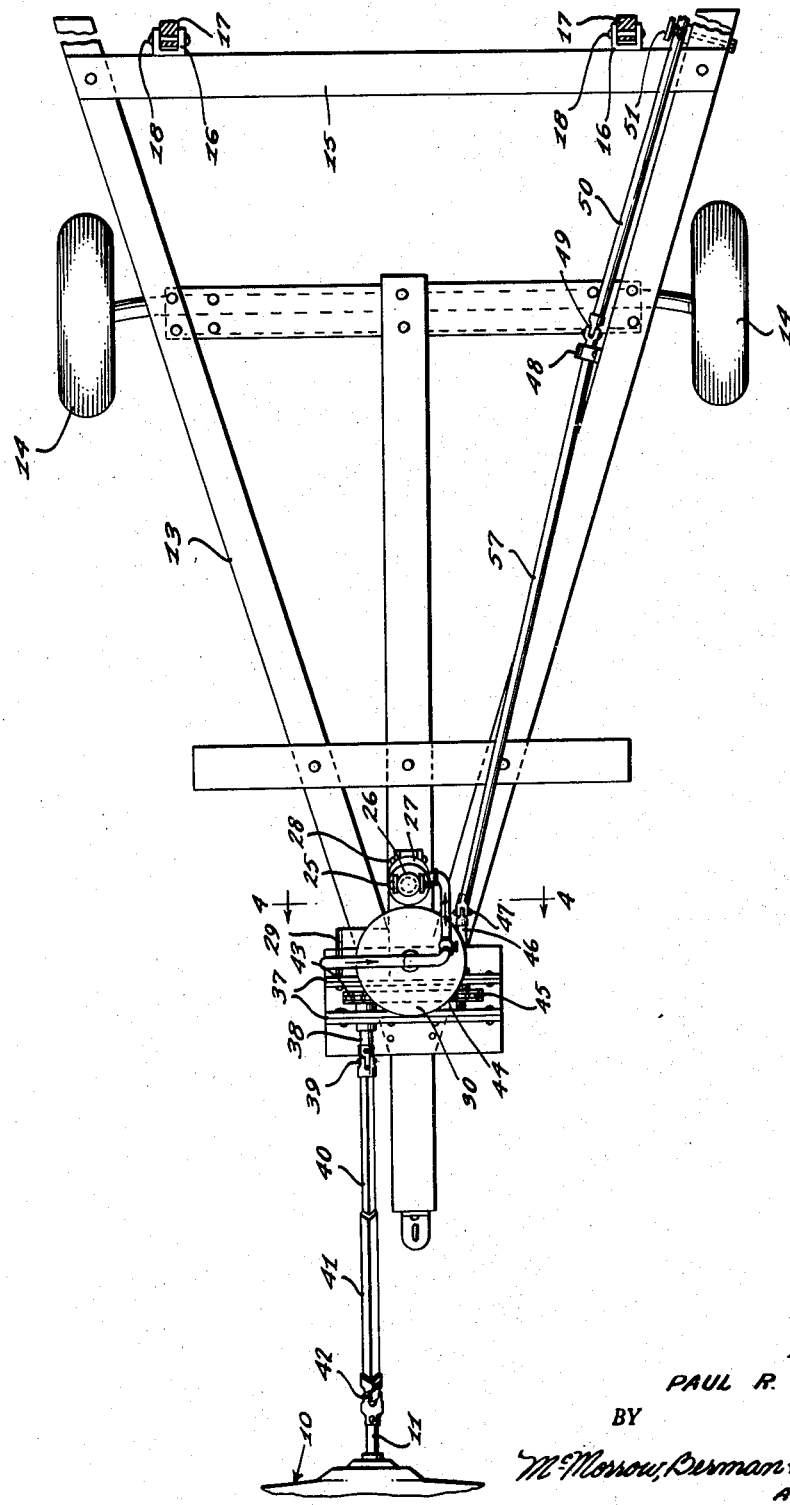

Patented Sept. 20, 1949

2,482,413

UNITED STATES PATENT OFFICE

2,482,413

COMBINED TRACTOR POWERED DUMP WAGON AND ELEVATOR

Paul R. Gibson, Miller, S. Dak.

Application April 20, 1948, Serial No. 22,217

2 Claims. (Cl. 214—83.16)

1

The invention relates to a combined dump wagon adapted to be towed by a tractor and actuated thereby to and from a dumping position.

An object of the invention is to provide an improved trailer for a tractor which comprises a dump body, means powered by the tractor for moving the body to and from a dumping position, an elevator associated with the dump body for elevating material dumped therefrom to a discharge station, and means operatively connecting said elevator to the tractor to power the elevator.

A further object is to provide in combination with a tractor including a power take-off shaft a trailer including means operatively connectible to said power take-off shaft for actuating a dump body to and from a dumping position, an elevator adapted to receive material dumped from said body, and means operatively connecting said elevator to said power take-off shaft to drive the elevator.

A further object is to provide in a device such as that last described a driven power take-off shaft carried by the trailer longitudinally thereof and adapted to be detachably connected to the power take-off shaft of the tractor and to the elevator.

Other objects and advantages reside in the particular structure of the invention, the structure of the several elements thereof, combination and arrangement of such elements, and will be readily understood by those skilled in the art upon reference to the attached drawing in connection with the following specification, wherein the invention is shown, described and claimed.

In the drawing:

Figure 3 is a plan view of the trailer according to the invention with the dumping body therefor removed;

Figure 5 is an elevational view, parts being broken away, and showing the means for connecting the elevator to the power take-off shaft of the tractor.

Figure 1:
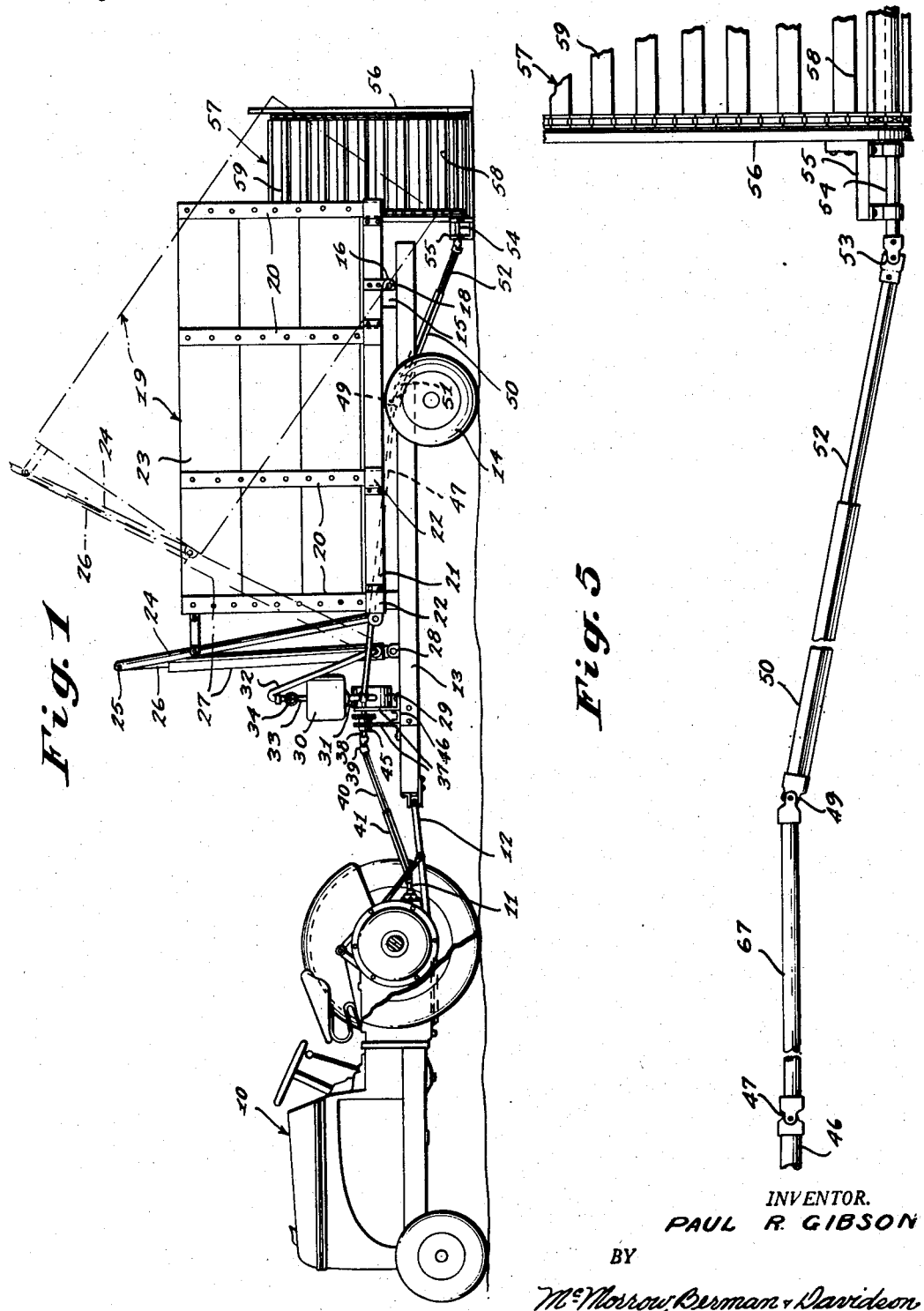
Figure 1 is an elevational view with parts broken away showing the device of the invention operatively connected to a tractor.
Figure 2:
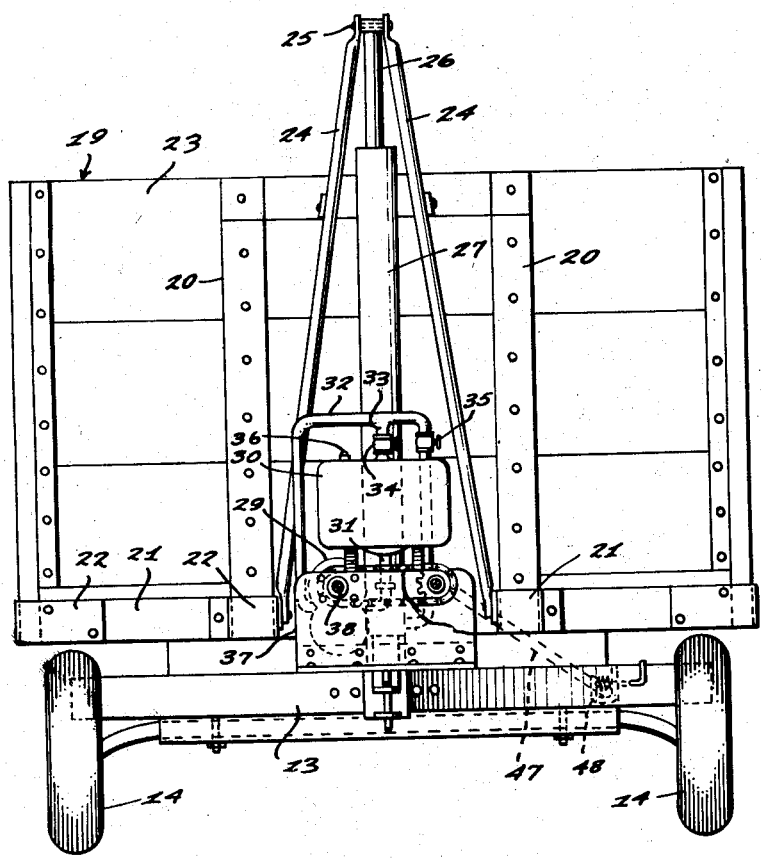
Figure 2 is a front end view of the device according to the invention apart from the tractor.
Figure 4:
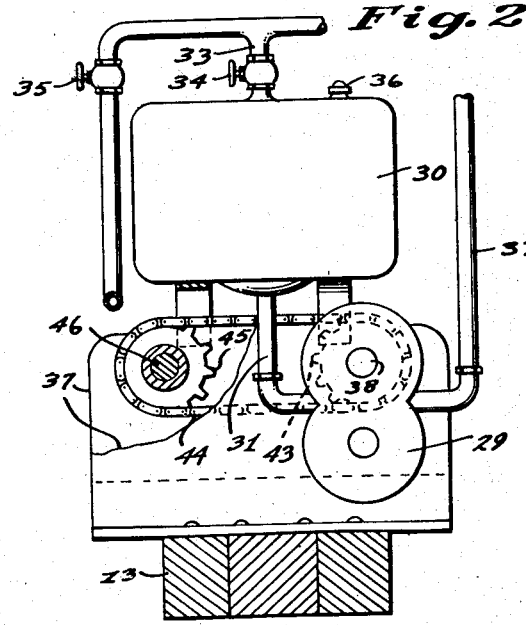
Figure 4 is an enlarged vertical transverse section taken substantially on the plane of the line 4—4 of Figure 3.

Referring specifically to the drawing, 10 designates generally any suitable tractor which includes a rearwardly-directed power take-off shaft 11 and a rearwardly-directed hitch 12. The hitch

2

12 is adapted to be detachably connected to a trailer which includes a rigid frame 13 supported by any suitable running gear, such as the wheels 14. A rear portion of the frame 13 may be provided with a transverse frame member 15 to which is connected, Figure 3, a pair of laterally-spaced rearwardly-directed ears 16 adapted to receive depending hinge-providing members 17 of a body 19. Hinge pins 18 extend through the members 17 and ears 16 to hingedly connect the rear portion of the body 19 to the frame 13. As is clearly shown in broken lines, Figure 1, such a connection permits dumping of the body by elevating the front end through means to be described later.

The body 19 may comprise a floor 21, the outer edges of which preferably include stirrups 22 for securing the lower ends of posts 20 supporting side and end boards 23. Thus, the body comprises an open-topped receptacle for the transporting of any suitable material. The rear end board 23, is preferably provided with a dumping opening, not shown, adjacent the floor 21, whereby loose material contained in the body 19 may be discharged rearwardly and downwardly from the body when the same is elevated to the broken line dumping position of Figure 1.

The forward end of the body 19 has secured thereto in any suitable manner a pair of laterally-spaced and substantially vertically-extending frame members 24. The upper ends of the members 24 are laterally adjacent to each other and are connected together and pivotally connected to the upper end 26 of a piston rod by any suitable pivot means 25. The piston rod 26 is fixed to a piston, not shown, which is slidable in the substantially vertically-disposed cylinder 27 of a hydraulic ram. The lower end of the ram cylinder 27 is pivoted to the frame 13 by any suitable pivot-providing means 28 extending transversely of the frame. As is readily apparent in Figure 1, upon actuation of the piston rod 26 upwardly, the body 19 is moved to the broken line position and the contents thereof are dumped out the rearward end thereof. While this is occurring, the cylinder 27 is swung rearwardly on its pivot 28. Lowering of the piston rod 26 will return the body 19 to the full line position.

To actuate the hydraulic ram, there is provided any suitable rotary pump 29 mounted on the frame 13 by means to be described later. A tank 30 for hydraulic fluid is disposed above the pump 29 and supplies hydraulic fluid thereto by means of a conduit 31 leading to the intake side of the pump. A conduit 32 extends from the output side of the pump and is operatively connected to the lower end of the cylinder 27 of the ram to actuate the piston rod 26 thereof. Interposed in the output conduit 32 is a branch conduit 33 returning fluid to the tank 30. A manually-operated valve 34 is provided in the conduit 33 and a second manually-operated valve 35 is provided in the conduit 32 beyond the branch conduit 33. That is to say, the valve 35 is between the branch conduit 33 and the cylinder 27. When the pump is operating and it is desired to actuate the hydraulic ram, the valve 34 in the branch conduit 33 is closed and the valve 35 is open, whereby hydraulic fluid is supplied to the cylinder and the ram is actuated. When the ram is elevated to a desired degree, the valve 35 may be closed and the body 19 will be maintained in an elevated position. At the same time, the valve 34 is open and fluid from the pump is recirculated to and through the tank and back to the pump without additiontal pressure being exerted in the cylinder 27.

The pump 29 and tank 30, together with the associated conduits, are rigidly supported on one of a pair of vertically-directed plates 37 rigidly secured to the frame 13 in any suitable manner forwardly of the cylinder 27. The plates 37 are spaced longitudinally of the frame 13 and provide journals for a drive shaft 38 for the pump. One end of the drive shaft 38 extends forwardly of the foremost plate 37 and is connected by any suitable universal joint to a square shaft 40 which in turn is slidably received in a complementary torsion tube 41 operatively connected to the power take-off shaft 11 of the tractor by a universal joint 42. Thus, it is readily apparent that upon disconnection of the hitch 12 from the trailer, the torsion tube 41 may be readily slipped off of the squared shaft 40 to disconnect the tractor from the pump. The drive shaft 38 has fixed thereon between the plates 37 a sprocket 43 which is connected by a suitable chain 44 to a second sprocket 45 which is fixed to a counter-shaft 46 which is likewise journaled between the plates 37 in laterally-spaced relation to the drive shaft 38. The rear end of the counter-shaft 46 extends rearwardly of the rearmost plate 37 and is operatively connected by a universal joint 47 to a rearwardly-directed shaft 67 which is rotatably supported on the frame 13 by a journal or bracket 48. Rearwardly of the bracket 48 the shaft 67 is connected by universal joint 49 to a square torsion tube 50 which in turn is rotatably supported in a bracket 51. As best seen in Figure 5, the rear end of the torsion tube 50 has a slidable connection with a squared shaft 52 the rear end of which is connected by a universal joint 53 to a driven shaft 54. The shaft 54 is journaled in a suitable bracket 55 extending laterally of the side of the supporting frame 56 for an endless-belt type of elevator 57. The elevator 57 includes a portion 58 which extends horizontally below the rear end of the body 19 whereby it is out of the way of the body when the same is elevated to the broken line position, Figure 1. Such horizontally-disposed portion 58 of the conveyor receives material from the body and transports it laterally of the body to an upwardly-directed portion of the elevator designated by the reference character 59. The upper end of the elevator portion 59 is adapted to discharge material from the body 19 to any suitable elevated discharge station in a well known manner. Likewise, the conveyor 57 may comprise any suitable and/or well known type of portable power-driven elevator which is adapted to be self-supporting on the ground rearwardly of the body 19. The sliding connection between the torsion tube 50 and the squared shaft 52 permits the elevator 57 to be readily detachably connected to the shafting 46, 67 and 50 which comprises an auxiliary power take-off shaft which may well be used to actuate other power-driven means as well as the elevator.

In the use of the device, it is readily apparent that the elevator 57 may be positioned on the ground adjacent the discharge station. Then, when the tractor 10 and the trailer bring a load of material to the vicinity of the elevator, the squared shaft 52 of the latter is operatively connected to the torsion tube 50 of the trailer. With the valve 34 closed and the valve 35 open, the power take-off shaft 11 of the tractor is rotated and the trailer body 19 is elevated to the broken line position, Figure 1. When the same reaches a desired elevation, the valve 34 is opened and the valve 35 closed, whereby to maintain the trailer body elevated. Thereafter, the discharge opening, not shown, in the rear wall of the trailer body is opened and material is discharged onto the horizontal portion 58 of the elevator. When the body 19 is emptied, the take-off shaft 11 is stopped and the valve 35 is opened, whereby the weight of the body 19 returns the parts to the full line position of Figure 1. Return of the body 19 to the horizontal full line position is facilitated by a combined filling opening and vent 66 in the tank 30 which may be utilized to exhaust air from the tank as the fluid is forced back thereinto from the cylinder 27. The tractor may now be driven off as the slip joint between the torsion tube 50 and squared shaft 52 will permit ready disengagement of the trailer from the elevator 57. When a new load of material has been brought to the site of the elevator, the parts may be reconnected and the operation repeated.

Thus, it is apparent that there has been provided means for readily and rapidly unloading a trailer body and transporting the material unloaded therefrom to a discharge station by power-actuated means. Likewise, while I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. The combination with a tractor including a power take-off shaft, of a trailer adapted to be towed by said tractor, said trailer including a frame, a dumping body carried by said frame, an endless conveyor type of elevator, means mounting said elevator to receive material dumped from said body, a hydraulic pump carried by said frame, a hydraulic ram operatively connected to said pump for actuation thereby, means mounting said ram on said frame and operatively connecting the same to said body for moving the same to and from a dumping position upon actuation of said ram in opposite directions, a driven shaft positioned intermediate said pump and said take-off shaft and operatively connected at its one end to said power take-off shaft and its other end to said pump to drive the latter, a second power take-off shaft, means mounting said second shaft on said frame longitudinally thereof, means operatively connecting said second shaft to the other end of said driven shape for actuation thereby, and means for detachably connecting said second shaft to said elevator to drive the latter.

2. The combination with a tractor including a power take-off shaft, of a trailer adapted to be towed by said tractor said trailer including a frame, a dumping body carried by said frame, an endless conveyor type of elevator, means mounting said elevator to receive material dumped from said body, a driven shaft on said trailer frame, means operatively connecting one end of said driven shaft to said take-off shaft, power means carried by said trailer frame adjacent the other end of said driven shaft for moving said body to and from a dumping position, means operatively connecting the other end of said driven shaft to said power means to drive the latter, a counter-shaft carried by said trailer frame longitudinally thereof, means operatively connecting said other end of said driven shaft to said counter-shaft, and means detachably connecting said counter-shaft to said elevator to drive the latter.

PAUL R. GIBSON.

REFERENCES CITED

The following references are of record in the file of this patent:

UNITED STATES PATENTS

| Number | Name | Date |
| --- | --- | --- |
| 2,102,432 | Nesseth | Dec. 14, 1937 |
| 2,325,492 | Erickson | July 27, 1943 |
| 2,405,727 | Aaberg | Aug. 13, 1946 |
| 2,419,824 | Davis | Apr. 29, 1947 |
| 2,431,000 | Step | Nov. 18, 1947 |